(12) United States Patent  (10) Patent No.: US 9,381,398 B2
Richardson et al.  (45) Date of Patent: *Jul. 5, 2016

(54) SPORTS SIMULATION SYSTEM

(75) Inventors: Todd E. Richardson, Tottenham (CA); Wayne Dawe, Richmond Hill (CA); Zuqiang Zhao, Richmond Hill (CA)

(73) Assignee: Interactive Sports Technologies Inc., Vaughn, Ontario (CA)

( * ) Notice: Subject to any disclaimer, the term of this patent is extended or adjusted under 35 U.S.C. 154(b) by 158 days.

This patent is subject to a terminal disclaimer.

(21) Appl. No.: 13/405,748

(22) Filed: Feb. 27, 2012

(65) Prior Publication Data

US 2012/0220385 A1 Aug. 30, 2012

Related U.S. Application Data

(63) Continuation of application No. 11/195,017, filed on Aug. 2, 2005, now abandoned, which is a continuation-in-part of application No. 10/629,945, filed on Jul. 30, 2003, now Pat. No. 7,544,137.

(51) Int. Cl.
*A63F 13/00* (2014.01)
*A63B 24/00* (2006.01)
(Continued)

(52) U.S. Cl.
CPC ......... *A63B 24/0021* (2013.01); *A63B 69/3658* (2013.01); *A63F 13/10* (2013.01);
(Continued)

(58) Field of Classification Search
CPC .... A63B 69/00; A63B 2024/00; A63B 24/00; A63B 24/0003; A63B 57/0075; A63B 63/00; A63B 63/003; A63B 63/004; A63B 63/006; A63B 63/007; A63B 71/00; A63B 71/04; A63B 71/06; A63B 69/36; A63B 69/3617; A63B 69/362; A63B 69/3658; A63B 69/3661; A63B 69/3691; A63B 69/40; A63B 2220/00; A63B 2220/05; A63B 2220/12; A63B 2220/18; A63B 2220/20; A63B 2220/30; A63B 2220/34; A63B 2220/35; A63B 2220/36; A63B 2220/40; A63B 2220/44; A63B 2220/58; A63B 2220/70; A63B 2220/80; A63B 2220/805; A63B 2220/806; A63B 2220/807; A63B 2220/83; A63B 2243/00; A63B 2243/0029; G07F 17/3223; A63F 13/00; A63F 13/04; A63F 13/21; A63F 13/213; A63F 13/214; A63F 13/55; A63F 13/57; A63F 13/573; A63F 13/812; A63F 2250/00; A63F 2250/10; A63F 2250/1005; A63F 2250/11; A63F 2250/18; A63F 2250/20; A63F 2250/21; A63F 2250/30; A63F 2300/00; A63F 2300/10; A63F 2300/105; A63F 2300/30; A63F 2300/55; A63F 2300/60; A63F 2300/6045; A63F 2300/80; A63F 2300/8011

USPC ........... 273/317, 317.2, 340, 348, 108, 108.2, 273/118 R

See application file for complete search history.

(56) References Cited

U.S. PATENT DOCUMENTS 3,655,202 A 4/1972 Gautraud et al.
3,729,315 A 4/1973 Conklin et al.
(Continued)

OTHER PUBLICATIONS

GameZone Online Tiger Woods PGA Tour 2003.
(Continued)

*Primary Examiner* — Tramar Harper
*Assistant Examiner* — Jeffrey Wong
(74) *Attorney, Agent, or Firm* — Faegre Baker Daniels LLP (57) ABSTRACT

A sports simulation system includes a projectile tracker having a display presenting a three-dimensional sports scene. The projectile tracker captures images of a projectile tracking region disposed in front of the display to detect a launched projectile traveling through the tracking region towards the display. A processing stage, in communication with the projectile tracker, is responsive to data received from camera devices to determine three-dimensional positions, velocity, acceleration and spin of a detected projectile traveling through the tracking region, which are used by the processing stage to calculate a trajectory of the launched projectile into the three-dimensional sports scene.

35 Claims, 10 Drawing Sheets

(51) Int. Cl.
  *A63F 13/40* (2014.01)
  *F41J 5/10* (2006.01)
  *A63B 69/00* (2006.01)
  *A63B 69/36* (2006.01)
  *A63B 71/06* (2006.01)

(52) U.S. Cl.
  CPC .............. *F41J 5/10* (2013.01); *A63B 24/0084* (2013.01); *A63B 69/002* (2013.01); *A63B 69/0002* (2013.01); *A63B 69/0026* (2013.01); *A63B 69/3623* (2013.01); *A63B 71/0622* (2013.01); *A63B 2024/0031* (2013.01); *A63B 2024/0034* (2013.01); *A63B 2071/0638* (2013.01); *A63B 2071/0691* (2013.01); *A63B 2102/32* (2015.10); *A63B 2207/02* (2013.01); *A63B 2220/05* (2013.01); *A63B 2220/13* (2013.01); *A63B 2220/30* (2013.01); *A63B 2220/35* (2013.01); *A63B 2220/40* (2013.01); *A63B 2220/70* (2013.01); *A63B 2220/806* (2013.01); *A63B 2225/02* (2013.01); *A63B 2225/20* (2013.01); *A63B 2243/007* (2013.01); *A63F 2300/1087* (2013.01); *A63F 2300/64* (2013.01); *A63F 2300/646* (2013.01); *A63F 2300/8011* (2013.01)

(56) References Cited

U.S. PATENT DOCUMENTS

| | | | |
|---|---|---|---|
| 3,837,655 A | 9/1974 | Angelos | |
| 4,150,825 A | 4/1979 | Wilson | |
| 4,160,942 A * | 7/1979 | Lynch | A63B 24/0021 359/443 |
| 4,805,159 A | 2/1989 | Negendank et al. | |
| 4,858,922 A | 8/1989 | Santavaci | |
| 5,056,791 A | 10/1991 | Poillon et al. | |
| 5,111,410 A | 5/1992 | Nakayama et al. | |
| 5,221,082 A | 6/1993 | Curchod | |
| 5,333,874 A | 8/1994 | Arnold et al. | |
| 5,342,054 A | 8/1994 | Chang et al. | |
| 5,437,457 A | 8/1995 | Curchod | |
| 5,443,260 A | 8/1995 | Stewart et al. | |
| 5,626,526 A | 5/1997 | Pao et al. | |
| 5,649,706 A | 7/1997 | Treat, Jr. et al. | |
| 5,768,151 A * | 6/1998 | Lowy et al. | 463/2 |
| 5,796,474 A | 8/1998 | Squire et al. | |
| 5,846,139 A | 12/1998 | Bair et al. | |
| 5,906,547 A | 5/1999 | Tynan | |
| 5,926,780 A | 7/1999 | Fox et al. | |
| 5,938,545 A | 8/1999 | Cooper et al. | |
| 5,984,794 A | 11/1999 | Miremadi | |
| 6,098,458 A | 8/2000 | French et al. | |
| 6,254,492 B1 | 7/2001 | Taggett | |
| 6,308,565 B1 | 10/2001 | French et al. | |
| 6,322,455 B1 | 11/2001 | Howey | |
| 7,038,764 B2 | 5/2006 | Lee | |
| 7,335,116 B2 | 2/2008 | Petrov | |
| 2002/0036617 A1 | 3/2002 | Pryor | |
| 2003/0088362 A1 | 5/2003 | Melero et al. | |
| 2005/0023763 A1 | 2/2005 | Richardson | |
| 2005/0159231 A1 | 7/2005 | Gobush | |
| 2006/0030429 A1 | 2/2006 | Rankin | |
| 2006/0063574 A1 | 3/2006 | Richardson et al. | |
| 2007/0293331 A1 | 12/2007 | Tuxen | |

OTHER PUBLICATIONS

Office Action dated Oct. 17, 2007 in corresponding U.S. Appl. No. 11/195,017.
Office Action dated Oct. 26, 2009 in corresponding U.S. Appl. No. 11/195,017.
Office Action dated Jul. 6, 2010 in corresponding U.S. Appl. No. 11/195,017.
Amendment filed in corresponding U.S. Appl. No. 11/195,017 dated Apr. 27, 2008.
Amendment filed in corresponding U.S. Appl. No. 11/195,017 dated May 25, 2010.
Amendment filed in corresponding U.S. Appl. No. 11/195,017 dated Jan. 28, 2011.
Office Action dated May 23, 2008 in U.S. Appl. No. 11/394,004.
Amendment dated Nov. 24, 2008 in U.S. Appl. No. 11/394,004.
Final Office Action dated Feb. 20, 2009 in U.S. Appl. No. 11/394,004.
Amendment After Final filed Aug. 20, 2009 in U.S. Appl. No. 11/394,004.
Office Action dated Jul. 6, 2010 in U.S. Appl. No. 11/394,004.
Amendment dated Jan. 6, 2011 in U.S. Appl. No. 11/394,004.
Final Office Action dated Nov. 7, 2012 in U.S. Appl. No. 11/394,004.
Office Action and translation of same dated Nov. 26, 2013 in corresponding Japanese Application No. 2012-264163.

\* cited by examiner

SPORTS SIMULATION SYSTEM

RELATED APPLICATIONS

This application is a continuation of U.S. patent application Ser. No. 11/195,017, filed Aug. 2, 2005 for an invention entitled SPORTS SIMULATION SYSTEM, which is a continuation-in-part of U.S. patent application Ser. No. 10/629,945 filed on Jul. 30, 2003 for an invention entitled SPORTS SIMULATION SYSTEM, the content of which are incorporated herein by reference.

FIELD OF THE INVENTION

The present invention relates generally to entertainment systems and in particular to a sports simulation system.

BACKGROUND OF THE INVENTION

Sports simulation systems designed to simulate sports experiences are well known in the art. In many conventional sports simulation systems, a player propels a sports projectile such as a ball, puck, arrow, dart, etc. at a target image presented on a display screen. The motion of the sports projectile is detected and imaged and an extrapolation of the trajectory of the sports projectile is made. The extrapolated trajectory is then used to determine a sports result. The displayed image is in turn updated to reflect the sports result thereby to provide the player with visual feedback and simulate a sports experience.

The goal of all sports simulation systems is to provide the player with a realistic sports experience. As a result, many variations of sports simulation systems have been considered in attempts to simulate accurately "real-life" sports experiences. For example, U.S. Pat. No. 5,333,874 to Arnold et al. discloses a sports simulator having a housing and two arrays of infrared (IR) receivers and emitters positioned in the housing. A launch area is established near one end of the housing. A user can launch an object such as a golf ball located in the launch area and drive the golf ball into the housing through the planes defined by the arrays of IR emitters and against a screen positioned at one end of the housing. A computer is connected to the IR receivers, which detect the passage of the object through the respective planes. Based upon the signals from the IR receivers, the computer uses triangulation techniques to determine the horizontal and vertical position, as well as the velocity of the golf ball. The computer can also determine the spin of the golf ball and cause an image of the golf ball as it would have appeared traveling away from the golfer had it not encountered the screen to be displayed on the screen.

U.S. Pat. No. 5,443,260 to Stewart et al. discloses a baseball training and amusement apparatus that detects the speed and projected flight of a batted baseball. The apparatus includes a ball delivery device, a pair of detection planes, a computer and a video and simulation monitor. The detection planes are parallel to one another and are spaced apart by a distance such that a batted ball passing through the detection planes would be a fair ball in a real baseball game. Each detection plane includes a rigid frame that supports a pair of optical scanners and a pair of light sources. The optical scanners and light sources are positioned at opposite top corners of the rigid frame and are aimed downwardly into the region encompassed by the frame.

During use, the ball delivery apparatus delivers a baseball towards a player positioned in front of the detection planes. When the player strikes the baseball with a bat and the baseball travels through the detection planes, the optical scanners capture images of the baseball. The images are processed to determine the coordinates of the baseball as it passes through each of the detection planes as well as the velocity of the baseball. A simulated trajectory of the baseball is then calculated using the determined coordinate and velocity information. The simulated trajectory information is used to update the graphical images presented on the monitor so that the simulated flight of the batted baseball is displayed to the player thereby to simulate a batting experience.

U.S. Pat. No. 5,649,706 to Treat, Jr. et al. discloses a hunting simulator for in-flight detection of a launched missile such as an arrow. The hunting simulator includes a screen and a projector for projecting a moving target on the screen. Electromagnetic radiation emitters are positioned in front of the screen adjacent its opposite top corners and illuminate a plane in front of the screen. Sensors are also positioned adjacent the opposite top corners of the screen and are responsive to the electromagnetic radiation emitters. Retroreflective tape extends along opposite sides of the plane.

During use, when an arrow is launched at the screen and passes through the plane, the sensors detect the presence of the arrow and generate output. The output of the sensors is used to determine the coordinates of the arrow as well as the velocity of the arrow. A simulated trajectory of the arrow is then calculated and the graphical images presented on the screen are updated accordingly to reflect the flight of the launched arrow. In this manner, a hunting experience is simulated.

U.S. Pat. No. 5,768,151 to Lowy et al. discloses a system for determining the trajectory of an object in a sports simulator. The system includes a baseball throwing device to deliver a baseball towards a player area. A projector adjacent the player area presents images on a display screen that is positioned near the ball throwing device and in front of a batter. Video cameras are positioned in front of and on opposite sides of the anticipated trajectory of a hit baseball.

During use when a baseball delivered by the ball throwing device is hit by the batter and passes through the fields of the view of the video cameras, images of the baseball are captured and a streak showing the path of the baseball through the fields of view is determined. The streak is used to simulate the flight of the baseball and to update the image presented on the display screen thereby to simulate a batting experience.

Although the above references show sports simulation systems that capture images of launched projectiles and use the image data to simulate the flights of the launched projectiles, these sports simulation systems fail to provide "true to life" sports experiences as a result of the mechanisms used to track the path of the launched projectiles. As will be appreciated, improved sports simulation systems that provide better and more realistic sports experiences are desired.

It is therefore an object of the present invention to provide a novel sports simulation system and a novel projectile tracking apparatus.

SUMMARY OF THE INVENTION

Accordingly in one aspect there is provided a sports simulation system comprising:

a projectile tracking apparatus including a display surface on which a visually apparent three-dimensional sports scene is presented, and at least one pair of camera devices capturing images of a projectile tracking region disposed in front of said display surface to detect a launched projectile traveling through said projectile tracking region towards said display surface, each camera device including processing capabilities processing captured images to detect the presence of a launched projectile therein; and at least one processing stage receiving data from the camera devices relating to images in which a launched projectile exists and determining the three-dimensional positions, velocity, acceleration and spin of a detected projectile traveling through said projectile tracking region, the three-dimensional positions, velocity, acceleration and spin being used by said at least one processing stage to calculate a trajectory of said launched projectile into said visually apparent three-dimensional sports scene.

In one embodiment, the at least one processing stage uses the calculated trajectory to generate updated image data including a simulation of the launched projectile into the visually apparent three-dimensional sports scene following the calculated trajectory. A projection device is coupled to the at least one processing stage. The projection device receives image data from the at least one processing stage and presents the visually apparent three-dimensional sports scene including the simulation on the display surface. The visually apparent three-dimensional scene may include at least one foreground action element overlying and moveable over a background image. The at least one processing stage updates the image data so that the at least one foreground action element responds to the simulation of the launch projectile.

In one embodiment, the projectile tracking apparatus includes a frame and at least one pair of camera devices mounted on the frame adjacent opposite top corners thereof. The camera devices have overlapping fields of view looking downwardly, across and in front of the display surface and capture images of the projectile tracking region. Each camera device examines captured images to detect pixel clusters resembling a projectile characteristic signature thereby to detect the projectile in the captured images. The three-dimensional sports scene is developed from ground level and overhead images of a real life sports environment. The overhead images include at least one of satellite and aerial photographs.

According to another aspect there is provided a sports simulation system comprising:

a projectile tracking apparatus including a frame encompassing a display surface on which a video sequence portraying a visually apparent three-dimensional sports scene is presented; at least one pair of digital camera devices mounted on said frame and having fields of view looking across and in front of said display surface that overlap in a generally perpendicular fashion and encompassing a projectile tracking region, each of said digital camera devices including a first processor for processing image data and generating two-dimensional projectile coordinates when a projectile travels through said projectile tracking region and is captured in images acquired by said digital camera devices; and an audio system to broadcast audio accompanying said video sequence;

a host processor communicating with said digital camera devices and said audio system, said host processor calculating a three-dimensional trajectory of said projectile using the two-dimensional projectile coordinates received from each first processor and outputting image data including said calculated three-dimensional trajectory; and a display unit receiving said image data and presenting said video sequence including a simulation of said calculated trajectory on said display surface.

According to yet another aspect there is provided a sports simulation system comprising:

at least one pair of digital camera devices having overlapping fields of view looking across and in front of a display surface;

at least one processing stage processing image data from the camera devices relating to images in which a launched projectile exists and determining the three-dimensional positions, velocity, acceleration and spin of a detected projectile traveling through said overlapping fields of view, the three-dimensional positions, velocity, acceleration and spin being used by said at least one processing stage to calculate a trajectory of said launched projectile into a visually apparent three-dimensional sports scene projected onto said display surface; and a projection unit presenting said three-dimensional sport scene on said display surface including a simulation of said projectile following said calculated trajectory, said three-dimensional sports scene including image frames developed from a three-dimensional terrain model generated from images of a real life sports environment.

The sports simulation system provides advantages in that since the positions, velocity, acceleration and spin of the launched projectile are determined generally continuously as the launched projectile moves through the fields of view of the camera devices, the flight of the launched projectile can be simulated more accurately. This of course results in a more realistic sports experience. The sports simulation system also provides advantages in that virtually any type of projectile may be tracked avoiding the need for a specialized projectile. In addition, the projectile may be launched at the projectile tracking apparatus from a variety of positions providing greater flexibility and enhancing the sports experience.

BRIEF DESCRIPTION OF THE DRAWINGS

An embodiment will now be described more fully with reference to the accompanying drawings in which.

DETAILED DESCRIPTION OF THE PREFERRED EMBODIMENT

Figure 1:
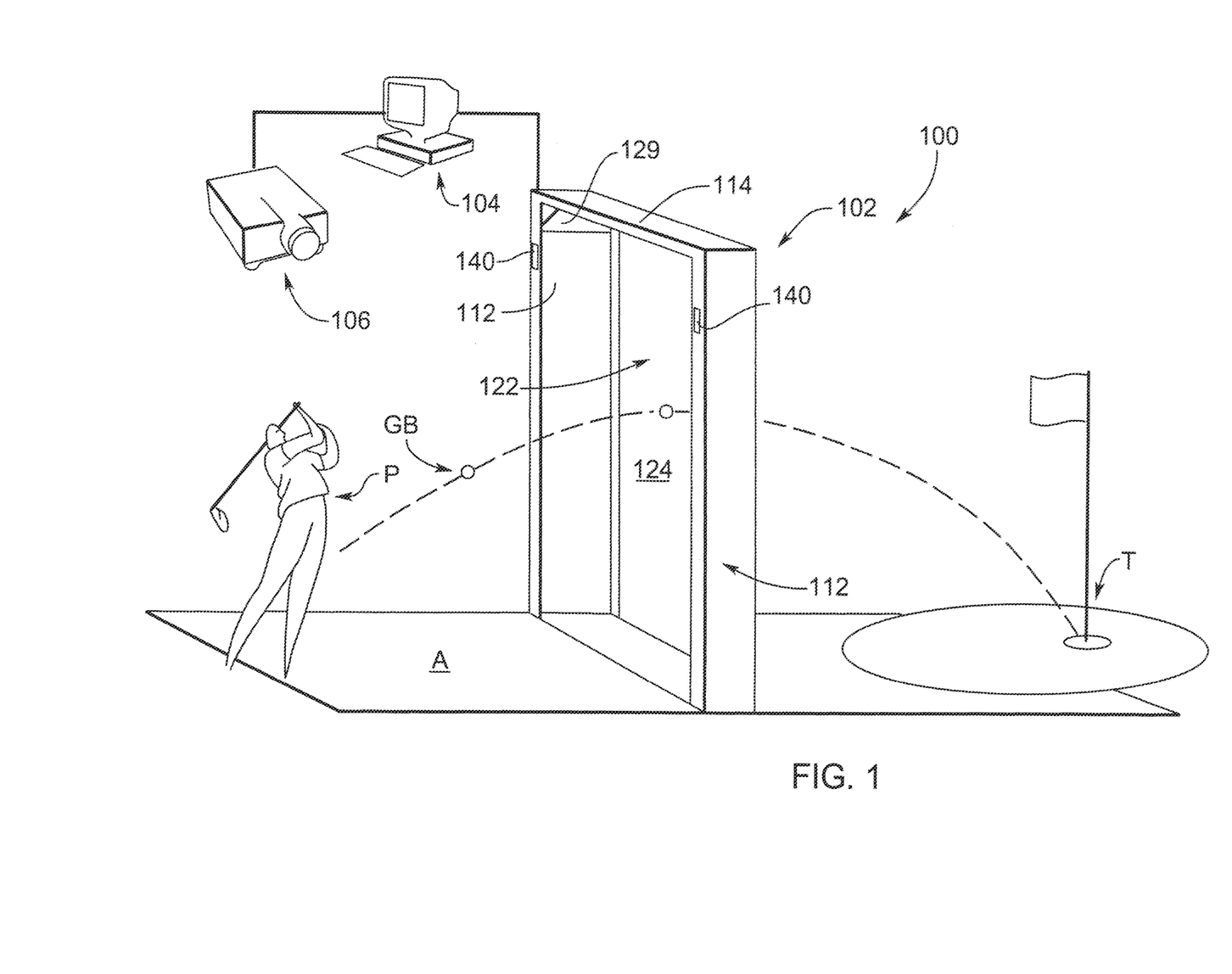
FIG. 1 is a perspective of a sports simulation system in accordance with the present invention.
Figure 2:
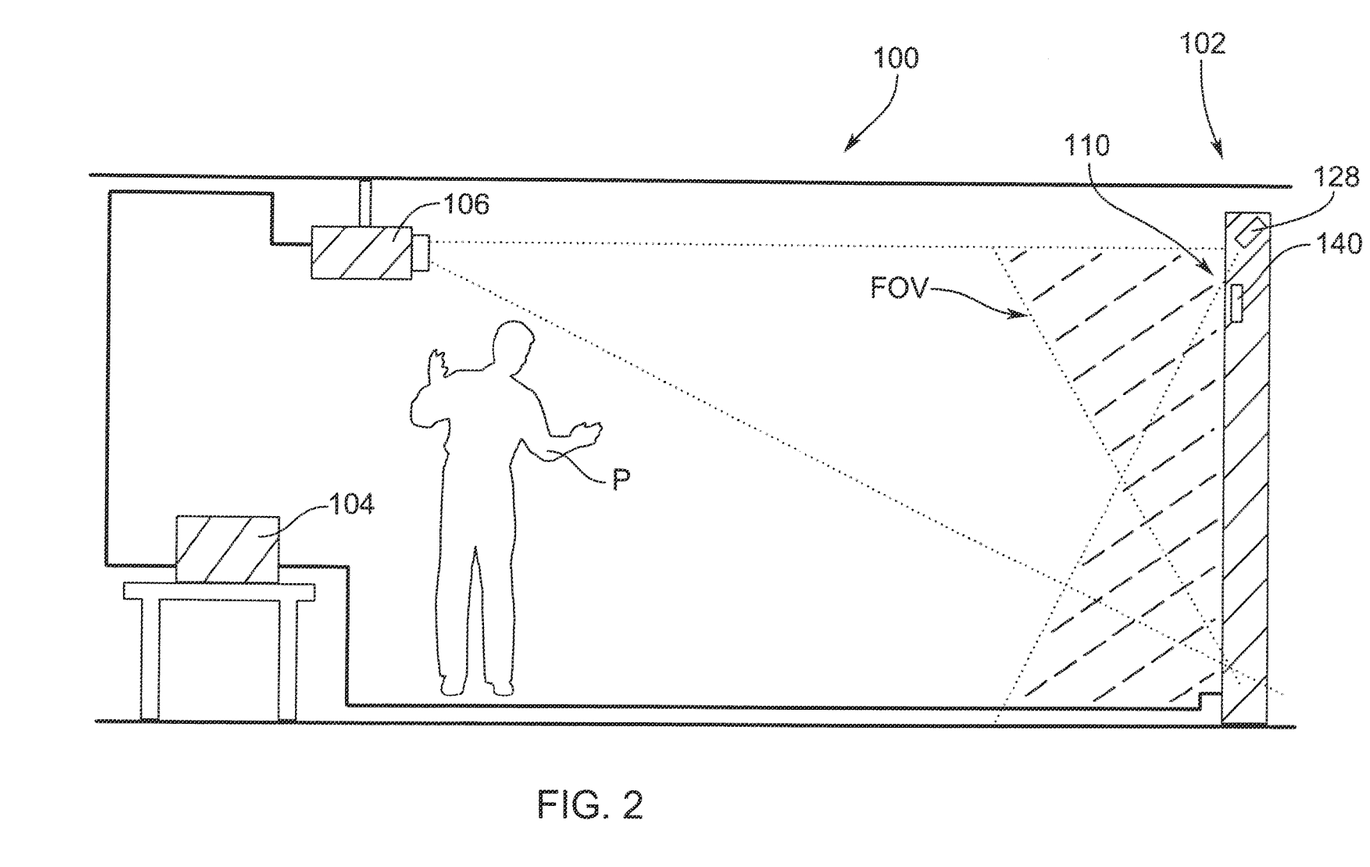
FIG. 2 is a side elevation view of the sports simulation system of FIG. 1.
Figure 3:
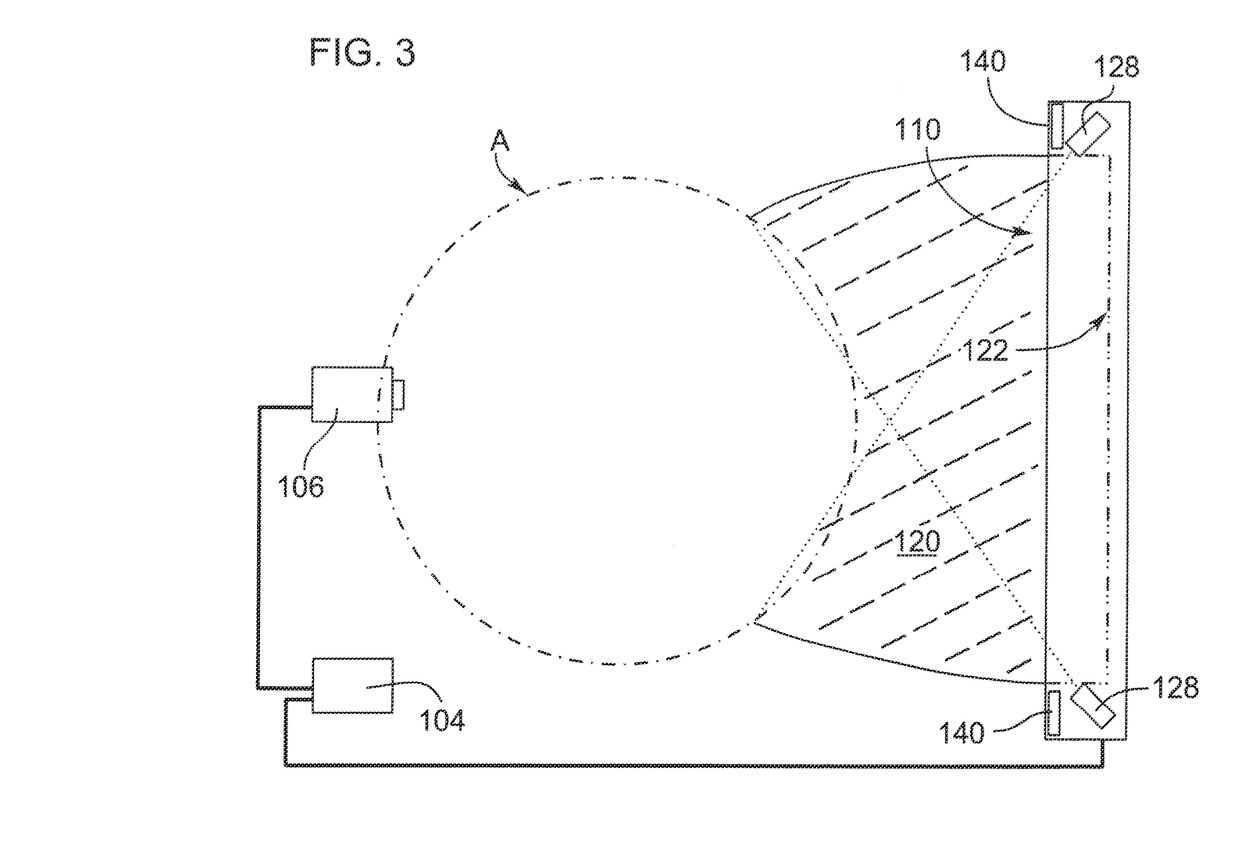
FIG. 3 is a top plan view of the sports simulation system of FIG. 1.

Turning now to FIG. 1, a sports simulation system is shown and is generally identified by reference numeral 100. As can be seen, sports simulation system 100 includes a projectile tracking apparatus 102 disposed in front of a player area A in which a player P stands. A host computer 104 is coupled to the projectile tracking apparatus 102 via a high-speed serial data link and to a ceiling mounted front video projector 106 that is aimed at the projectile tracking apparatus 102. The computer 104 outputs video image data to the projector 106, which in turn projects a video sequence on the projectile tracking apparatus 102. The video sequence portrays a visually apparent three-dimensional sports scene including a target T at which a projectile is to be launched. In this embodiment, the sports simulation system 100 simulates golf and thus, the three-dimensional sports scene is golf related and includes an image of a golf course hole, practice range etc. The projectile to be launched at the projectile tracking apparatus of course is a golf ball GB.

The projectile tracking apparatus 102 outputs two-dimensional projectile position data to the computer 104 when the launched golf ball GB travels through a projectile tracking region monitored by the projectile tracking apparatus. The computer 104 in turn processes the two-dimensional projectile position data to determine the three-dimensional positions, launch velocity, acceleration and spin of the golf ball so that the trajectory of the golf ball can be calculated. The calculated trajectory is then used to determine a sports result and to update the image data conveyed to the projector 106 so that the presented video sequence shows a simulation of the golf ball travel into the visually apparent three-dimensional scene as well as the determined sports result. As a result, the projectile tracking apparatus 102, the computer 104 and the projector 106 form a closed loop in response to a launched golf ball. Further specifics of the sports simulation system 100 will now be described with reference to FIGS. 1 to 10.

FIGS. 2 to 5 better illustrate the projectile tracking apparatus 102. As can be seen, the projectile tracking apparatus 102 includes an upright, inverted U-shaped frame 110 having a pair of side posts 112 and a crossbar 114 extending between the upper ends of the posts 112. A screen 122 is supported by the frame 110. In this embodiment, the screen 122 has a 4:3 aspect ratio making it particularly suited for displaying conventional television images. Those of skill in the art will however, appreciate that other image formats can be used. The screen 122 is loosely fastened to the back of the frame 110 at spaced locations.

The screen 122 includes multiple layers and is designed to reduce projectile bounce as well as enhance protection behind the screen. The first or front layer of the screen 122 is formed of highly reflective nylon having some elasticity to resist permanent stretching/pocketing and abrasion. As a result, the front layer provides an excellent display surface 124 on which images projected by the projector 106 are presented. The second or intermediate layer of the screen 122 is formed of soft and thick material and is designed to absorb projectile energy with reduced elastic effect thereby to inhibit stretching and or damage to the front layer. The third or back layer of the screen 122 is formed of a tough heavy canvas to which the intermediate layer can transfer energy. The back layer also inhibits excess deformation of the intermediate layer when contacted by a launched projectile. As a result, if the projectile tracking apparatus 102 is placed adjacent a wall surface or the like, the back layer protects the surface behind the screen 122 from projectile strike thereby to inhibit damage to the surface and/or significant projectile rebound. If a space is provided behind the projectile tracking apparatus 102, the back layer provides ample protection for the space.

Figure 4:
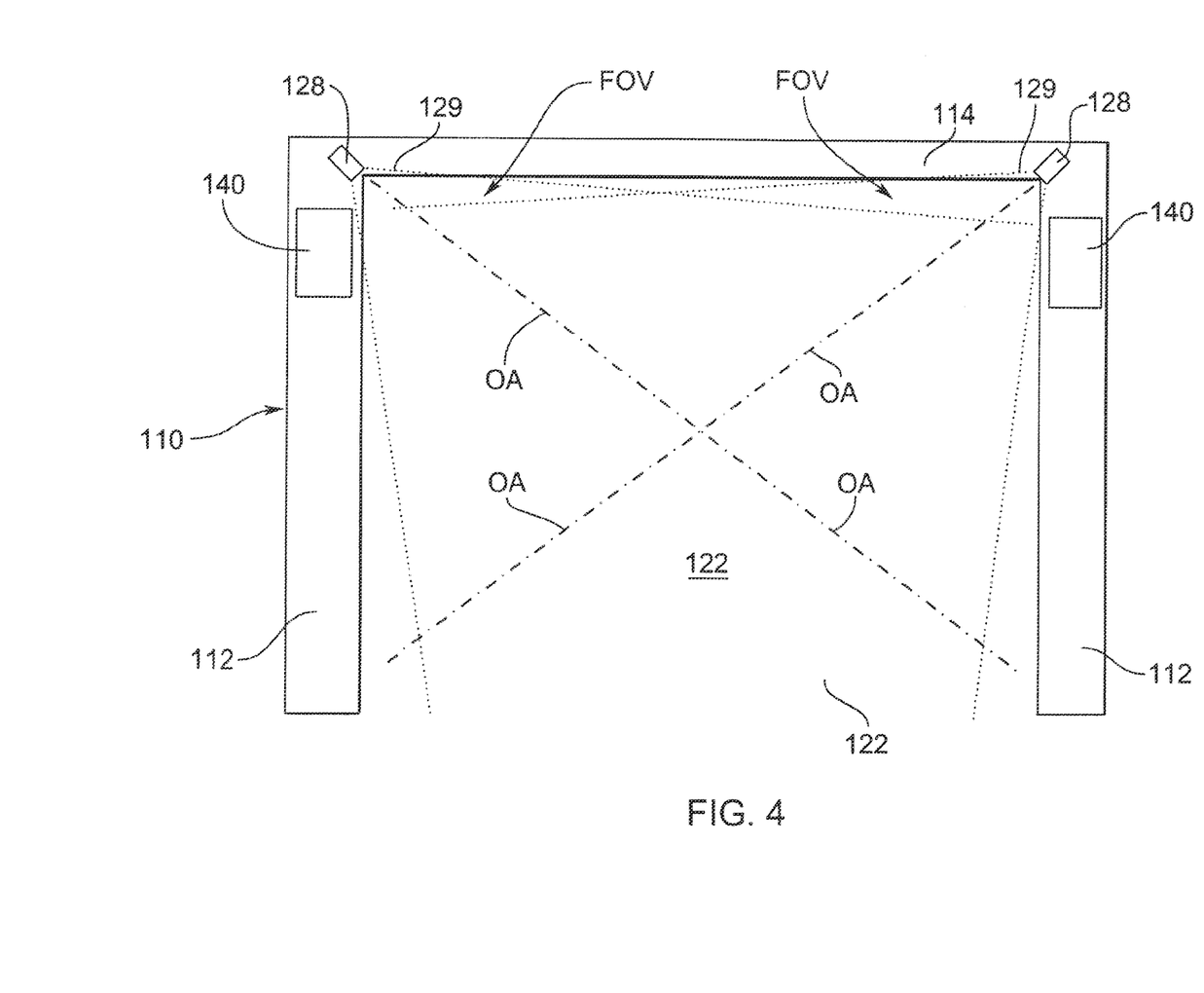
FIG. 4 is a front elevation view of a projectile tracking apparatus forming part of the sports simulation system of FIG. 1.
Figure 5:
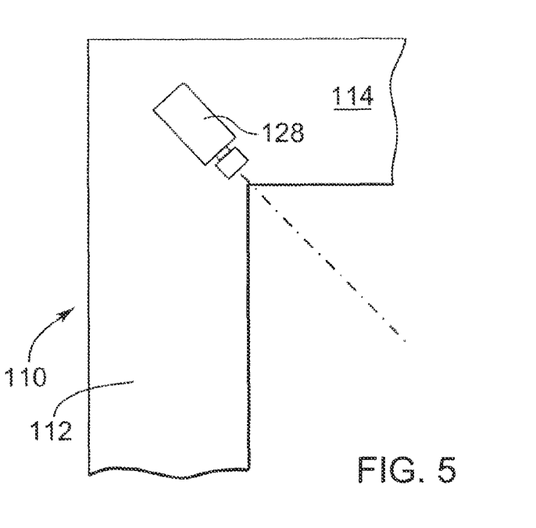
FIG. 5 is an enlarged front elevation view, partly in section, of a portion of the projectile tracking apparatus of FIG. 4 showing a digital camera.

A pair of high speed digital cameras 128 is accommodated within the frame 110 with each camera being positioned adjacent a different top corner of the frame. Thus, the cameras 128 are positioned in front of the player and to the left side and right side of the anticipated projectile path. The cameras 128 are also angled to point downwardly and towards the player position so that the fields of view of the cameras are generally perpendicular and overlap in a region extending from the projectile launch point to the screen 122. In this manner, the path of the projectile can be tracked from its launch point until it impacts the screen and then as it rebounds from the screen 122.

In this embodiment, each digital camera 128 has at least a 640 by 480 pixel array and includes built-in processing capabilities comprising field programmable gate arrays, a high performance 32-bit microprocessor and high speed memory. The distributed processing capabilities achieved by using the cameras 128 and the personal computer 104 allow the cameras to be operated at very high frame rates thereby allowing multiple images of a fast moving projectile to be captured as it travels through the projectile tracking region 120. This is due to the fact that the cameras 128 need only send data to the personal computer 104 relating to images in which projectile motion has been detected allowing high speed projectiles to be tracked without excessive bandwidth between the personal computer 104 and the cameras 128 being needed. For example, in the case of a projectile travelling through the projectile tracking region 120 at a speed of 200 miles per hour, the frame rates of the digital cameras 128 are selected such that at least four images of the projectile are captured by each digital camera 128. The viewing angles of the digital cameras 128 and the dimensions of the frame 110 are selected to provide the digital cameras 128 with a resolving accuracy of approximately 1 mm per pixel. As a result, a small projectile such as a golf ball will activate approximately 12 pixels per image. This resolving accuracy enables even small, very fast moving launched projectiles to be readily determined in captured images and as a result, reduces false projectile detection.

Infrared (IR) light emitting diode (LED) arrays (not shown) are also positioned within the posts 112 beside the digital cameras 128. The illumination axes of the IR LED arrays are generally coincident with the optical axes OA of the cameras. Each IR LED array emits IR radiation that is directed into the projectile tracking region 120. As the cameras 128 are responsive to both visible and infrared light, providing the background IR illumination allows the projectile tracking apparatus 102 to work well in a variety of ambient lighting conditions. In situations where a small fast moving projectile is launched, the IR illumination allows for detection of the projectile without interfering with the visual quality of the displayed image presented on the screen 122.

Audio speakers 140 are provided on the posts 112 and are aimed forwardly toward the player area A. The audio speakers 140 are driven by an audio amplifier (not shown) accommodated within the frame 110. The audio amplifier receives audio input from the computer 104 during play that is conveyed to the audio speakers 140 for broadcast thereby to enhance the sports experience.

The projector 106 preferably has a resolution of at least 800×600, at least 1200 ANSI Lumens brightness, a short throw lens, vertical 'keystone' correction, and the capacity to accept digital RGB computer video signals, and NTSC/PAL baseband television video signals. Projectors having this set of features include the Epson Powerlite 820P, the Toshiba TDP-DI-US, the InFocus LP650 and the Sanyo XP30 for example.

The computer 104 is preferably an IBM compatible personal computer including an Intel Pentium® processor, at least 128 MB SDRAM, a high-speed hard drive, and a DVD player. The computer 104 also includes a display adapter assembly including a reconfigurable 32-bit video memory buffer partitioned into three separate buffers. One of the buffers is used to store primary foreground image data representing one or more independent foreground action elements if appropriate for the sports scene being displayed. A second of the buffers is used to store background image data and the third buffer is used to store projectile trajectory image data. The display adapter assembly treats the foreground action, background and projectile trajectory image data as overlay image planes that are combined seamlessly to generate the video image data that is output to the projector 106. The overlay image planes are non-destructive so that when a foreground action element and/or projectile moves over an underlying image plane it is not necessary to redraw the underlying image plane. To reduce peak processing requirements, the computer 104 updates the background image data less frequently than the foreground image data. The computer 104 provides the output video image data to the projector 106 on a video output channel. The computer 104 receives external video feeds on a television/satellite/cable input channel, a video game input channel and an Internet input channel.

The computer 104 is mounted within a protective enclosure (not shown) having external connectors to enable the computer to be coupled to the projector 106, the audio amplifier and the digital cameras 130. The enclosure also includes external connectors to allow the computer 104 to receive the television/satellite/cable, external video game and Internet feeds. Input controls are also provided on the enclosure to allow a player to interact with the computer 104.

A high speed digital serial interface such as IEEE1394 is used between the computer and the cameras 128. Using this standard interface provides a low cost, high performance solution while avoiding use of expensive analog frame grabbers. The interface also simplifies wiring as the cameras 128 can be daisy-chained without loss of signal integrity.

The computer 104 executes sports simulation software stored in the SDRAM. In this example, the sports simulation software includes a golf simulation module that requires a player to hit the golf ball GB at the projectile tracking apparatus 102 in response to the video sequence displayed on the screen 122.

To provide a realistic playing experience, a high resolution elevation map of the golf course terrain is used. The course terrain elevation map is constructed from a combination of two-dimensional images that include overhead satellite and/or aerial photographs used in conjunction with digital photographs taken from ground level. Using photogrammetry techniques, these orthogonal views are combined together. Using common points in the images i.e. edges of sand hazards, trees etc., a three-dimensional model is synthesized without requiring reference targets to be applied to the terrain of interest.

Figure 6A:
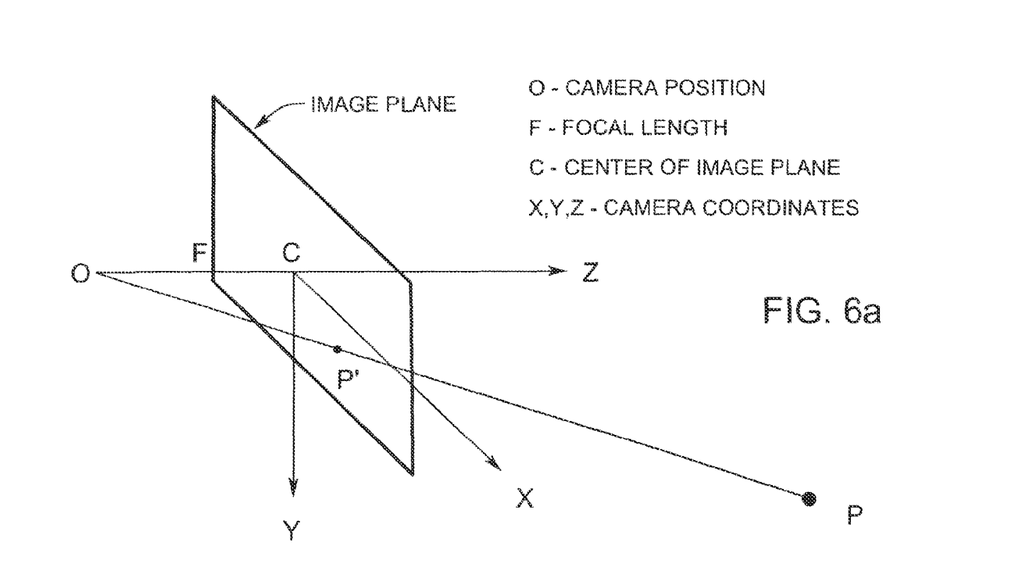
FIG. 6a shows a camera coordinate system used for perspective calculation.
Figure 6B:
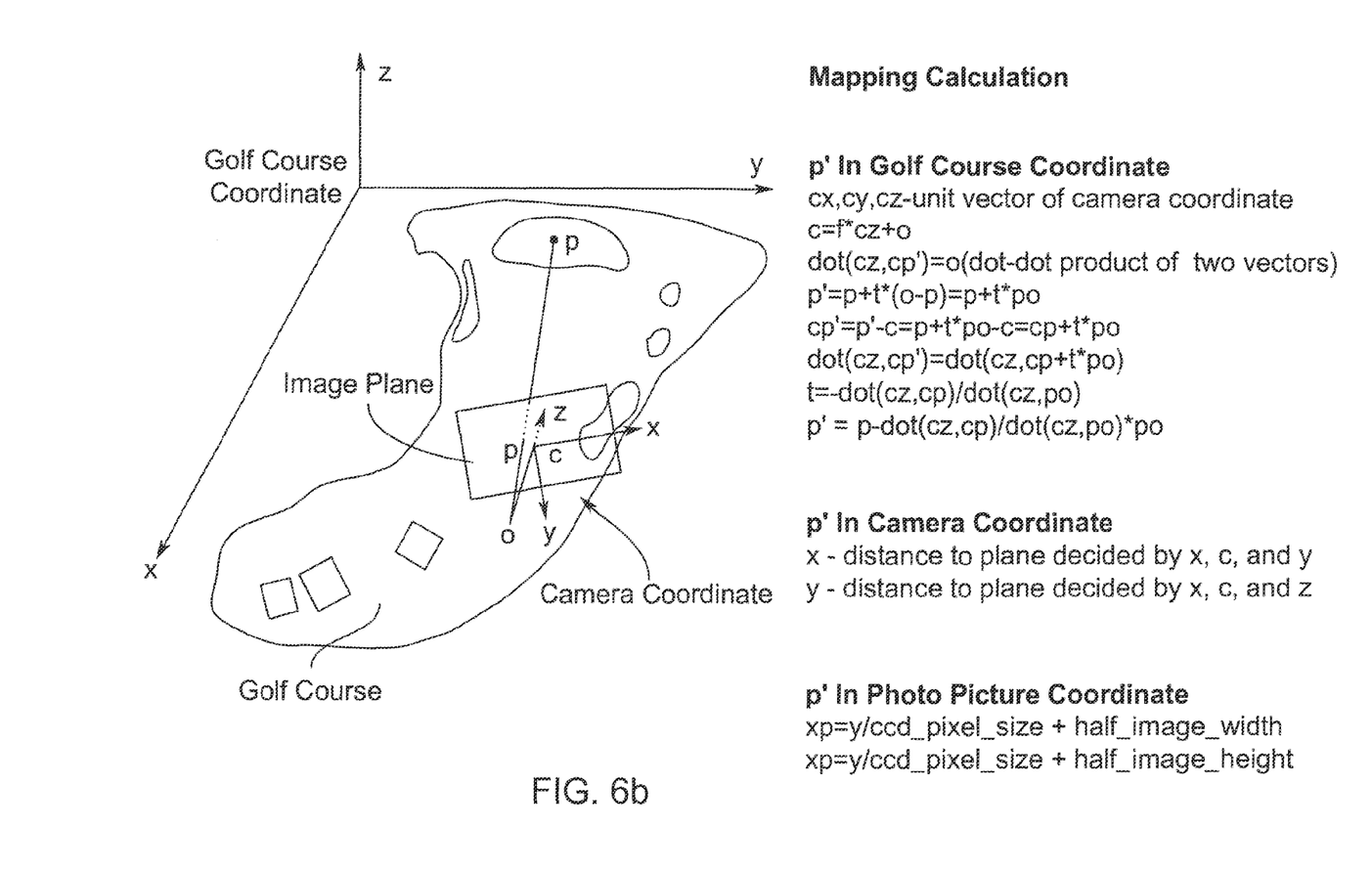
FIG. 6b shows a golf course coordinate system and equations used to map objects on the golf course to a two-dimensional image.

During mapping of the golf course to two-dimensional images a pinhole model for the digital cameras 128 is used, wherein a point p in the real world is mapped to point p' in the plane of the two-dimensional image. FIG. 6a shows the camera coordinate system used for perspective calculation and FIG. 6b shows the golf course coordinate system and the equations to map objects on the golf course into a two-dimensional image. This enables a visually realistic trajectory of a golf ball along a golf course to be presented.

Figure 7:
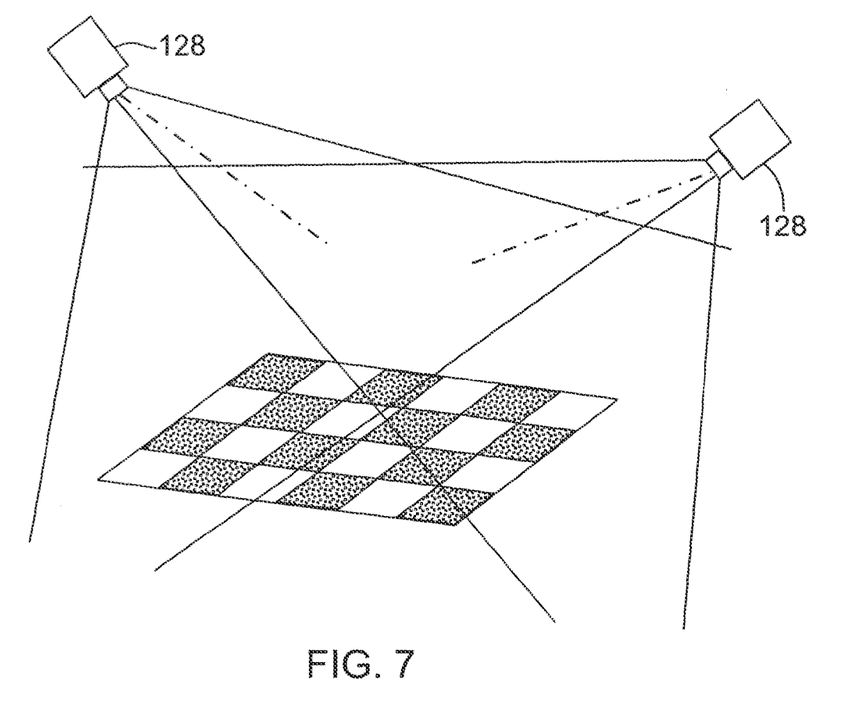
FIG. 7 is a checkerboard pattern used during digital camera calibration showing how stereoscopic vision is established to provide accurate tracking of a projectile in three-dimensional space.

The digital cameras 128 are self-calibrating using a checkerboard pattern as shown in FIG. 7. The checkerboard pattern is moved in a random pattern in the field of view of the camera being calibrated and then placed in the overlapping area of the two cameras. No additional camera external to the cameras that are being calibrated is required. The checkerboard pattern allows for the intrinsic and extrinsic parameters for the camera model to be calculated thereby to establish stereovision and permit accurate tracking of the projectile in three-dimensional space. The intrinsic camera parameters are those that specify the camera characteristics including the focal length, the location of the image center in pixel coordinates, the effective pixel size, and the radial distortion coefficient of the lens. The extrinsic camera parameters describe the spatial relationship between the camera and the projectile tracking apparatus 102 and include the rotation matrix and translation vector specifying the transformation between the camera reference frame and the reference frame of the projectile tracking apparatus.

The relationship between a three-dimensional point M and its image projection m is given by the formula m=A[Rt]M, where A is the camera intrinsic matrix and (R,t) are extrinsic parameters, the rotation matrix R and translation vector t that relates the projectile tracking apparatus coordinate system to the camera coordinate system.

Camera lens distortion is modeled using four distortion parameters, two of which are radial and two of which are tangential. These distortion parameters are represented in the equations below by k1 and k2 for the radial distortion and p1 and p2 for the tangential distortion.

In the following equations (x, y) are ideal (distortion-free) and ($\tilde{x}$, $\tilde{y}$) are real (distorted) image physical coordinates:

$$\tilde{x}=x+x[k1r^2+k2r^4]+[2p1xy+p2(r^2+2x^2)]$$

$$\tilde{y}=y+y[k1r^2+k2r^4]+[2p2xy+p2(r^2+2y^2)]$$

where:

$$r^2=x^2+y^2$$

After the cameras 128 have been properly calibrated, the intrinsic and extrinsic parameter matrices are known and the three-dimensional point transformation can be calculated by finding the intersection of the two lines that result from the transformation of the two-dimensional point found in each camera 128 into three-dimensional space.

During execution of the golf simulation module, golf is simulated providing the player with a realistic sports experience. Skill levels, player preferences and statistics to be monitored can be set by the player prior to game play. The player can select whether to play against the computer 104, against another player or against an on-line player over an Internet connection. During execution of the practice routine, practice exercises are simulated. Again, skill levels, player preferences and statistics to be monitored can be set by the player prior to game practice. During execution of the training routine, training sessions are simulated.

Figure 8:
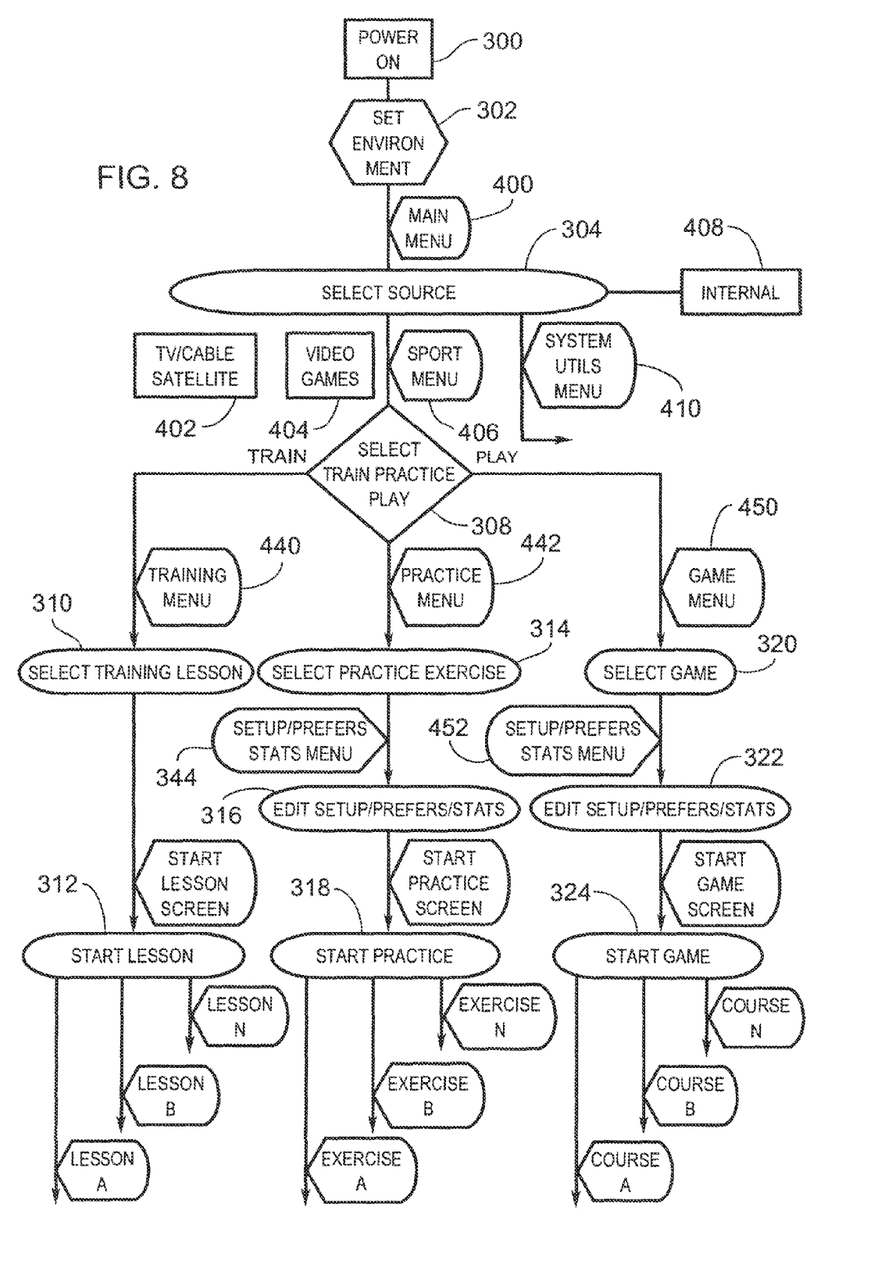
FIGS. 8 to 10 are flowcharts showing steps performed during player interaction with the sports simulation system of FIG. 1.
Figure 9:
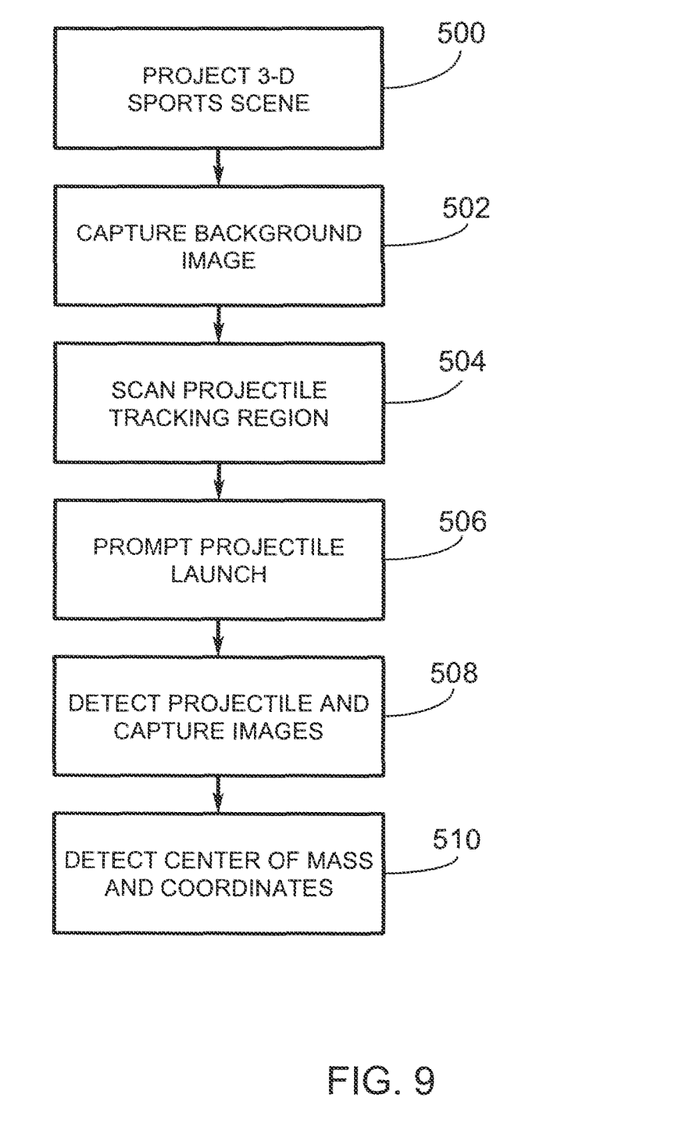
Figure 10:
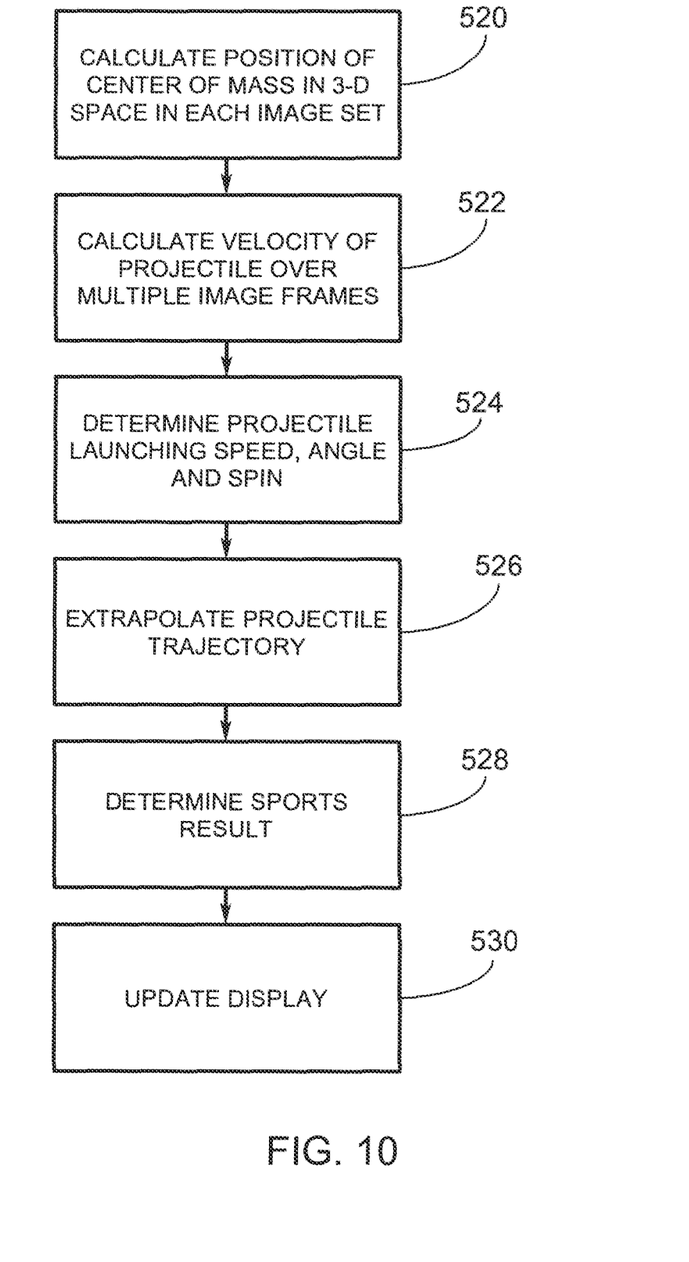

The initialization and operation of the sports simulation system 100 will now be described with particular reference to FIGS. 8 to 10. When the sports simulation system 100 is powered (step 300), the computer 104 performs a series of software diagnostics to set the environment and ensure that the projector 106, the digital cameras 128 and the audio amplifier are functioning properly (step 302). A main menu 400 is then presented on the display of the computer 104 that allows the player to select an input video source (step 304). Specifically, the main menu includes a television/satellite/cable option 402, an external video game option 404, a sports menu option 406, an Internet option 408 and a system utilities option 410. When one of options 402, 404 and 408 is selected, the appropriate incoming video feed received by the computer 104 is used to generate the video image data that is output to the projector 106 for display on the screen 122.

The computer 104 then presents a golf menu listing available operation modes (step 308). The available modes of operation include a training mode, a practice mode and a play game mode. The computer 104 also downloads the characteristic projectile signature to the on-board processors of the digital cameras 128.

When the training mode is selected, the computer 104 executes the training routine. During execution of the training routine, a training menu 440 is presented to the player allowing the player to select a training lesson (step 310). The training lessons cover various elements of golf and include video clips that provide tips from professional golfers. Once the training lesson has been selected, the training lesson is commenced (step 312).

When the practice mode is selected, the computer 104 executes the practice routine. During execution of the practice routine, a practice menu 442 is presented to the player allowing the player to select a practice session (step 314). The practice sessions include skills oriented practice exercises associated golf. Once the practice session is selected a setup menu 444 is presented to the player that provides the player with the ability to set the skill level, preferences and the statistics to be maintained during practice (step 316). Once the practice session setup has been completed, the selected practice session is commenced (step 318).

When the play game mode is selected, the computer 104 executes the play game routine. During execution of the play game routine, a game menu 450 is presented to the player allowing the player to select a game session (step 320). The game menu 450 presents a list of different golf courses that can be played. Once the game session is selected a setup menu 452 is presented to the player that provides the player with the ability to set the skill level, preferences and the statistics to be maintained during game play (step 322). Once the game session setup has been completed, the selected game is commenced (step 324).

During training, practice or game play, the computer 104 outputs video image data to the projector 106 causing the projector 106 to project a video sequence portraying a visually apparent three-dimensional sports scene on the display surface 124 that includes a target at which the projectile is to be launched (step 500). The computer 104 also conditions the digital cameras 128 to capture a background image of the projectile tracking region 120 devoid of a projectile (step 502) and then scan the projectile tracking region to look for the presence of a launched projectile at a very high frame rate in the order of 360 Hz (step 504). The player is then prompted to launch the golf ball GB at the screen 122 (step 506).

At this stage, the cameras 128 continually capture and process images to detect existence of a projectile. When the player launches the projectile at the projectile tracking apparatus 102 and the projectile enters the projectile tracking region 120, the projectile appears in the images captured by the digital cameras 128. Thus, the digital cameras 128 synchronously capture a series of images of the projectile as it travels through the projectile tracking region 120 (step 508). As the images are captured, the on-board processors of the digital cameras 128, which execute a motion detection algorithm, determine if a projectile exists in the images and if so, whether the projectile satisfies specified motion detection parameters defining a projectile characteristic signature. The projectile characteristic signature is used to ensure the detected projectile has characteristics matching the projectile in question, in this case, a struck golf ball. The projectile can therefore be distinguished from other objects captured in the images such as for example, a golf club head. In this example, the projectile characteristic signature specifies allowable projectile size, shape, reflectivity and speed.

If the detected projectile satisfies the characteristic signature, the images are further processed to determine the center of mass of the projectile in each image and its position in rectangular coordinates. As a result, a series of two-dimensional rectangular coordinates representing the two-dimensional positions of the projectile as it travels through the projectile tracking region 120 relative to each digital camera 128 is generated.

The two-dimensional rectangular coordinates generated by the cameras 128 are in turn conveyed to the computer 104. Upon receipt of the rectangular coordinates, the computer 104 calculates the positions of the projectile's center of mass in three-dimensional space throughout its travel through the projectile tracking region 120 including its collision and rebound with the screen 122 using triangulation techniques (step 520). With the position of the projectile in three-dimensional space known during its travel through the projectile tracking region 120 and knowing the frame rates of the digital cameras 128, the computer 104 calculates the launch velocity of the projectile and the velocity of the projectile over each image frame (step 522). The computer 104 then compares each calculated velocity with the previously calculated velocity to determine the acceleration of the projectile (step 524). The computer 104 also calculates the spin of the projectile based on its impact and rebound angles with and from the screen 122.

With the three-dimensional positions, launch velocity, acceleration and spin of the projectile known, the computer 104 extrapolates an accurate trajectory for the projectile allowing a realistic simulation of curved and/or arcing projectiles to be generated (step 526). The computed projectile trajectory is then used to determine a sports result by computing the intersection of the calculated projectile trajectory with the displayed video image (step 528). With the projectile trajectory computed and the sports result determined, the computer 104 updates the image data that is conveyed to the projector 106 so that the video sequence displayed on the display surface 124 of the screen 122 shows the simulated flight of the projectile and the sports result (step 530).

During video sequence display, when a simulation of the projectile flight is shown a graphical duplicate of the projectile is projected onto the display surface 124 of the screen 122 that begins its flight from the impact point of the projectile with the screen 122. In this manner, the projectile appears to continue its trajectory into the video scene thereby to achieve a realistic video effect. The three-dimensional scene is then updated in accordance with the sports result, allowing game play or practice to continue.

If desired, the computer 104 may store a sports rules reference library and/or a statistics library associated with each of the sports modules. In this case, the libraries are accessible during game play through pop-up menus presented on the display surface 124 to provide the player with relevant sports related data.

Although the sports simulation system 100 has been described as including a ceiling mounted front projector 106 in combination with a screen 122, those of skill in the art will appreciate that alternative projection devices may be used. For example, a rear video projector may be used to project images onto the rear surface of the display screen 122.

Those of skill in the art will appreciate that the projectile tracking apparatus 102 may include additional cameras at different locations to view the projectile tracking region and detect the existence of a launched projectile. Those of skill in the art will also appreciate that the number of processing stages may be increased or decreased as desired to handle processing of the digital camera image data effectively in real-time and provide a realistic projectile simulation.

While the projectile tracking apparatus is described as simulating golf, it will be appreciated that the projectile tracking apparatus may be used to simulate other sports where a projectile is launched. In such cases, the projectile characteristic signatures are updated to enable launched projectiles to be accurately tracked.

Although a preferred embodiment of the present invention has been described, those of skill in the art will appreciate that variations and modifications may be made without departing from the spirit and scope thereof as defined by the appended claims.

What is claimed is:

1. A sports simulation system comprising:
   a projectile tracking apparatus comprising a display surface on which a sports scene is presented, and at least one pair of camera devices aimed into a projectile tracking region from different vantages and having overlapping fields of view at least encompassing said projectile tracking region, said projectile tracking region extending from said display surface to a projectile launch area spaced in front of said display surface, said camera devices configured to capture images of said projectile tracking region, each camera device including processing capabilities and configured to process captured images to detect the presence of a launched projectile therein as the launched projectile travels from its launch position to its contact position with said display surface and then its rebound from said display surface; and
   at least one processing stage configured to receive data from the camera devices relating to images in which the launched projectile exists and determine three-dimensional positions, velocity, deceleration/acceleration and spin of the detected projectile traveling within said projectile tracking region, the spin being determined based on impact and rebound angles of the sports projectile with respect to the display surface, the three-dimensional positions, velocity, acceleration and spin being used by said at least one processing stage to calculate a trajectory of said launched projectile into said presented sports scene.

2. A sports simulation system according to claim 1 wherein said at least one processing stage is configured to use said calculated trajectory to generate updated image data representing a simulation of a flight path of said launched projectile beginning at the display surface contact position and traveling into said sports scene following said calculated trajectory.

3. A sports simulation system according to claim 2 further comprising a projection device coupled to said at least one processing stage, said projection device configured to receive image data from said at least one processing stage and present said sports scene including said simulation on said display surface.

4. A sports simulation system according to claim 3 wherein said sports scene includes at least one foreground action element overlying and moveable over a background image, said at least one processing stage configured to update said image data so that said at least one foreground action element responds to the simulation of said launched projectile.

5. A sports simulation system according to claim 3 wherein said projectile tracking apparatus includes a frame and wherein said at least one pair of camera devices is mounted on said frame, said camera devices having overlapping fields of view aimed across and in front of said display surface and configured to capture images of said projectile tracking region.

6. A sports simulation system according to claim 5 wherein said camera devices have generally perpendicular fields of view aimed downwardly, across and in front of said display surface from adjacent opposite top corners of said frame.

7. A sports simulation system according to claim 3 wherein each camera device is configured to examine captured images to detect pixel clusters resembling a projectile characteristic signature thereby to detect said projectile in said captured images.

8. A sports simulation system according to claim 7 wherein said projectile characteristic signature defines one or more of projectile size, shape, reflectivity and speed.

9. A sports simulation system according to claim 3 further comprising an audio system configured to broadcast audio accompanying said sports scene and simulation.

10. A sports simulation system according to claim 3 wherein said sports scene is developed from a combination of ground level and overhead images of a real life sports environment.

11. A sports simulation system according to claim 10 wherein said overhead images include at least one of satellite and aerial photographs.

12. A sports simulation system according to claim 3 wherein during processing, each camera device is configured to use a projectile signature to distinguish a launched projectile from other objects in said captured images.

13. A sports simulation system according to claim 12 wherein said projectile characteristic signature defines one or more of projectile size, shape, reflectivity and speed.

14. A sports simulation system comprising:
   a projectile tracking apparatus configured to track a launched sports projectile comprising a frame about a display surface on which a video sequence portraying a sports scene is presented, said sports scene including image frames developed from a three-dimensional terrain model generated from overhead images of a real life sports environment, said overhead images including at least one of satellite and aerial photographs; at least one pair of digital camera devices mounted on said frame at spaced locations and having fields of view aimed across and in front of said display surface that overlap and encompass a projectile tracking region extending from a sports projectile launch region in front of said display surface to said display surface, each of said digital camera devices including a first processor configured to process image data and generate two-dimensional projectile coordinates when a sports projectile travels from said sports projectile launch region into contact with said display surface and then its rebound from said display surface and is captured in images acquired by said digital camera devices, the two-dimensional projectile coordinates being generated continuously throughout the travel of the sports projectile; and an audio system configured to broadcast audio accompanying said video sequence;
   a host processor configured to communiate with said digital camera devices and said audio system, said host processor configured to use the two-dimensional projectile coordinates received from each first processor to determine three-dimensional positions, velocity, deceleration/acceleration and spin of the launched sports projectile, the spin being determined based on impact and rebound angles of the sports projectile with respect to the display surface, calculate a three-dimensional realistic trajectory of said sports projectile output image data including said calculated three-dimensional realistic trajectory; and
   a display unit configured to receive said image data and present said video sequence on said display surface, said video sequence representing a simulation of a flight path of said sports projectile beginning from the contact location of said sports projectile with said display surface so that the simulation represents a realistic continuance of the travel of the sports projectile beyond the display surface.

15. A sports simulation system according to claim 14 wherein said sports scene includes at least one foreground action element overlying and moveable over a background image, said host processor configured to update said image data so that said at least one foreground action element responds to the calculated three-dimensional realistic trajectory of said sports projectile.

16. A sports simulation system according to claim 14 wherein said host processor is configured to execute sports simulation software including at least two of a training mode, a practice mode and a game play mode, the video sequence being consistent with the selected mode.

17. A sports simulation system according to claim 14 wherein each said first processor is configured to examine captured images to detect pixel clusters resembling a projectile characteristic signature thereby to detect said projectile in said captured images.

18. A sports simulation system according to claim 17 wherein said projectile characteristic signature defines one or more of projectile size, shape, reflectivity and speed.

19. A sports simulation system according to claim 17 wherein said frame encompasses a rectangular region and wherein said digital camera devices are positioned at opposite corners of said frame.

20. A sports simulation system according to claim 14 wherein during processing, each camera device is configured to use a projectile signature to distinguish a launched projectile from other objects in said captured images.

21. A sports simulation system according to claim 20 wherein said projectile characteristic signature defines one or more of projectile size, shape, reflectivity and speed.

22. A sports simulation system comprising:
at least one pair of digital camera devices having overlapping fields of view aimed across and in front of a display surface from different vantages and configured to capture images of a launched projectile throughout its travel from a launch position in front of said display surface, to its contact position with said display surface and then its rebound from said display surface;
at least one processing stage configured to process image data from the camera devices relating to images in which the launched projectile exists and determine three-dimensional positions, velocity, acceleration and spin of the detected projectile traveling within said overlapping fields of view, the spin being determined based on impact and rebound angles of the sports projectile with respect to the display surface, the three-dimensional positions, velocity, acceleration and spin being used by said at least one processing stage to calculate a realistic trajectory of said launched projectile into a sports scene projected onto said display surface; and
a projection unit configured to present said sports scene on said display surface including a simulation of said projectile following said calculated realistic trajectory, said sports scene including image frames developed from a three-dimensional terrain model generated from images of a real life sports environment.

23. A sports simulation system according to claim 22 wherein said three-dimensional terrain model is generated from a combination of ground level and overhead images.

24. A sports simulation system according to claim 23 wherein said overhead photographs include at least one of satellite and aerial photographs.

25. A golf simulator comprising:
a display surface on which a golf scene is presented;
imaging devices having fields of view encompassing a region extending from said display surface to a golf ball launch area in front of said display surface and configured to capture images of said region; and
processing structure configured to receive image data from said imaging devices and process said image data to detect a launched golf ball as the launched golf ball travels from its launch position within said launch area to its contact position with said display surface and then its rebound from said display surface, said processing structure further configured to process said image data to determine three-dimensional positions, velocity, deceleration/acceleration and spin of the detected launched golf ball traveling within said region, the spin being determined based on impact and rebound angles of the golf ball with respect to the display surface, the three-dimensional positions, velocity, deceleration/acceleration and spin being used by said processing structure to calculate a realistic trajectory of said launched golf ball into said golf scene, wherein said processing structure is configured to use said calculated realistic trajectory to generate updated image data representing a simulation of a flight path of said launched golf ball beginning at the display surface contact position and traveling into said golf scene following said calculated realistic trajectory so that said simulation represents a realistic continuance of the travel of said golf ball beyond the display surface.

26. A golf simulator according to claim 25 further comprising a display device coupled to said processing structure, said display device configured to receive image data from said processing structure and present said golf scene including said simulation on said display surface.

27. A golf simulator according to claim 26 wherein said golf scene includes at least one foreground action element overlying and moveable over a background image, said processing structure configured to update said image data so that said at least one foreground action element responds to the simulation of said launched golf ball.

28. A golf simulator according to claim 27 wherein said golf scene includes a plurality of foreground action elements independently moveable over said background image.

29. A golf simulator according to claim 28 wherein said foreground action elements, background image and launched golf ball simulation are non-destructive overlay image planes that are combined seamlessly to complete said golf scene.

30. A golf simulator according to claim 27 wherein said at least one foreground action element, background image and launched golf ball simulation are non-destructive overlay image planes that are combined seamlessly to complete said golf scene.

31. A golf simulator according to claim 26 comprising at least one pair of imaging devices, said imaging devices having overlapping fields of view aimed across and in front of said display surface and configured to capture images of said region.

32. A golf simulator according to claim 31 wherein said imaging devices have generally perpendicular fields of view aimed across and in front of said display surface.

33. A golf simulator according to claim 31 wherein said golf scene includes at least one foreground action element overlying and moveable over a background image, said processing structure configured to update said image data so that said at least one foreground action element responds to the simulation of said launched golf ball.

34. A golf simulator according to claim 31 wherein said processing structure is configured to process said image data to detect pixel clusters resembling a characteristic signature thereby to detect said golf ball in said captured images.

35. A golf simulator according to claim 31 further comprising an audio system configured to broadcast audio.

* * * * *